US006768731B1

(12) United States Patent
Huh

(10) Patent No.: US 6,768,731 B1
(45) Date of Patent: Jul. 27, 2004

(54) INTERNET PHONE SYSTEM AND CONTROL METHOD THEREFOR

(75) Inventor: Jung Sun Huh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/421,894

(22) Filed: Oct. 21, 1999

(30) Foreign Application Priority Data

Dec. 5, 1998 (KR) .......................................... 98/53260

(51) Int. Cl.[7] .......................................... H04L 12/66
(52) U.S. Cl. .................................... 370/352; 370/466
(58) Field of Search .............................. 370/352–356, 370/410, 466, 384, 463, 465; 725/139, 131, 133, 141, 149, 151, 153

(56) References Cited

U.S. PATENT DOCUMENTS

| | | | | |
|---|---|---|---|---|
| 4,766,591 A | * | 8/1988 | Huang | 370/445 |
| 5,883,944 A | * | 3/1999 | Burke et al. | 379/159 |
| 6,049,531 A | * | 4/2000 | Roy | 370/395.53 |
| 6,172,991 B1 | * | 1/2001 | Mori | 370/474 |
| 6,236,653 B1 | * | 5/2001 | Dalton et al. | 370/352 |
| 6,243,376 B1 | * | 6/2001 | Ng et al. | 370/352 |
| 6,246,679 B1 | * | 6/2001 | Yamamoto | 370/352 |
| 6,295,293 B1 | * | 9/2001 | Tonnby et al. | 370/389 |
| 6,373,835 B1 | * | 4/2002 | Ng et al. | 370/352 |
| 6,377,570 B1 | * | 4/2002 | Vaziri et al. | 370/352 |
| 6,377,573 B1 | * | 4/2002 | Shaffer et al. | 370/356 |
| 6,456,625 B1 | * | 9/2002 | Itoi | 370/401 |
| 6,463,051 B1 | * | 10/2002 | Ford | 370/352 |
| 6,487,196 B1 | * | 11/2002 | Verthein et al. | 370/352 |
| 6,490,274 B1 | * | 12/2002 | Kim | 370/352 |
| 6,553,023 B1 | * | 4/2003 | Yamamiya et al. | 370/352 |
| 6,618,369 B1 | * | 9/2003 | Huh et al. | 370/352 |

OTHER PUBLICATIONS

Fred Halsall, Data Communications, Computer Networks and Open Systems, 1995, Addison–Wesley, Fourth Edition, pp. 285–289.*

* cited by examiner

Primary Examiner—Chi Pham
Assistant Examiner—Keith M. George
(74) Attorney, Agent, or Firm—Fleshner & Kim, LLP

(57) ABSTRACT

The present invention relates to an internet phone system and a control method therefor. In the conventional art, when the personal computers are used, a voice delay time is generated due to a limit of the operating system OS, in addition to the network delay time. Accordingly, a real time voice communication cannot be performed, thus reducing reliability of communication quality. When the IP phones are employed in order to overcome such a disadvantage, an operation cannot be carried out without a server. As a result, it is necessary to install the server merely for the operation of one IP phone, which results in complicated works and increased costs. The present invention provides the internet phone system which can remove a time delay of the IP phone itself by directly inputting an internet protocol address of the other party and by connecting the IP phone to a network without using a server, and the control method therefor. Accordingly, the constitution of the system is simplified, and thus the installing process is not complicated. In addition, the system constitution cost is reduced. Furthermore, the real time voice communication is possible, thereby removing the time delay of the phone itself. Consequently, the communication quality is improved.

2 Claims, 6 Drawing Sheets

CALL CONTROL FRAME

VOICE FRAME

INTERNET PHONE SYSTEM AND CONTROL METHOD THEREFOR

BACKGROUND OF THE INVENTION

1. Field of the Invention

The present invention relates to an internet phone system and a control method therefor, and in particular to an internet phone system which can remove a time delay of an internet phone itself by directly inputting an internet protocol IP address of the other party and by connecting the internet phone to a network without using a server, and a control method therefor.

2. Description of the Background Art

Recently, a local area network (hereinafter, referred to as "LAN") has been used as a more important communication means than a telephone network in offices. However, the LAN and the telephone network (extension telephones) are individually formed, thus requiring a double cost.

Accordingly, in order to solve the above-mentioned problem, the telephone network is replaced by the LAN by employing a terminal which can be operated in the LAN (hereinafter, referred to as "IP phone").

FIG. 1 is a constitutional diagram illustrating a state where a protocol based on a conventional call server is applied to the IP phone. As shown therein, a plurality of IP phones) IP Phone 1~IP Phone N and a plurality of personal computers PC 1~PC N are connected to the LAN. In addition, a call server having all state information and intermediating between the IP phones is connected to the LAN.

The link establishment process of the conventional IP phone will now be explained with reference to the accompanying drawings.

FIG. 2 is a state view illustrating the link establishment process of the conventional IP phone. As shown therein, a call step for link establishment starts hen the first IP phone IP Phone 1 outputs a setup message to the call server.

The call server checks a state of the first IP phone IP Phone 1 and a state of the second IP Phone 2 to which the first IP phone IP Phone 1 intends to link, and judges whether a link can be established therebetween. As a result of judgement, if the second IP phone IP Phone 2 can be linked, the call server outputs the setup message to the second IP phone IP Phone 2.

Thereafter, the second IP phone IP Phone 2 receiving the setup message confirms that it can be linked, and outputs a connect message to the call server. The call server outputs the connect message to the first IP phone IP Phone 1, thereby establishing the link between the first and second IP phones IP Phone 1, IP Phone 2.

FIG. 3 is a call processing flowchart of the conventional IP phone showing the process as shown in FIG. 2 in more detail.

Firstly, when dialing (S1), the setup message is transmitted to the call server (S2). Whether a state of the terminal at the designation is idle is judged (S3). If not, a setup rejection message is transmitted to a source IP phone (S4). If it is idle, the setup message is transmitted to a designation IP phone (S5), and whether the setup is accepted is judged (S6). If not, the setup rejection message is transmitted to the call server (S7), and to the source IP phone (S9), thereby disconnecting the call. When the setup is accepted in step 6 (S6), the connect message is transmitted to the call server (S8), and to the source IP phone (S10), thereby connecting the call and starting a bidirectional voice transmission.

In the case that the personal computers are used in the conventional art as described above, a voice delay time is generated due to a limit of the operating system OS, in addition to the network delay time. Accordingly, a real time voice communication cannot be performed, thus reducing reliability of communication quality. When the IP phones are employed in order to overcome such a disadvantage, an operation cannot be carried out without a server. As a result, it is necessary to install the server merely for the operation of one internet phone, which results in complicated works and increased costs.

SUMMARY OF THE INVENTION

Accordingly, it is an object of the present invention to provide an internet phone system which can remove a time delay of an internet phone itself by directly inputting an internet protocol IP address of the other party and by connecting the internet phone to a network without using a server, and a control method therefor.

In order to achieve the above-described object of the present invention, there is provided an internet phone system including: an Ethernet controller processing a medium access control frame received from a LAN; a switch unit selecting one of analog voice signals inputted from a speaker or handset in accordance with a control signal; a codec processing the analog voice signal inputted from the switch unit or a signal inputted from the LAN; a key input unit processing a key button input; a memory unit storing an inputted data; and a central processing unit controlling the whole operation of the internet phone system.

In addition, an internet phone processing flow in accordance with the present invention includes: a first step of dialing; a second step of transmitting a setup message to a designation IP phone; a third step of discriminating whether a setup is accepted; a fourth step of transmitting a setup rejection message to a source IP phone and disconnecting a call, when the setup is not accepted in the third step; and a fifth step of transmitting a connect message to the source IP phone, connecting the call, and starting a bidirectional voice transmission, when the setup is accepted in the third step.

A more detailed control method for an internet phone system according to the present invention includes: a first step of judging whether a key button signal is inputted; a second step of judging whether a ring signal is inputted, when the key button signal is not inputted as a result of judgment in the first step. Next, a third step of processing the key button signal in accordance with H.323 and transmission control protocol/internet protocol TCP/IP occurs, and processing a medium access frame (call control frame), when inputted as a result of judgment in the first step occurs. Then, a fourth step of judging whether the other party responds occurs, when the third step is finished. Next, a fifth step of processing a voice signal in a codec, processing it in accordance with real time protocol/user datagram protocol/ internet protocol RTP/UDP/IP, processing a medium access control frame (voice frame), and communicating with the other party, when the other party responds as a result of judgment in the fourth step occurs. Then, a sixth step of performing the fifth step, when the ring signal is inputted as a result of judgment in the second step, or returning to the first step when the ring signal is not inputted occurs. Finally, a seventh step of transmitting a busy signal and finishing the process occurs, when the other party does not respond as a result of judgment in the fourth step.

DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

An internet phone system in accordance with a preferred embodiment of the present invention will now be described in detail with reference to the accompanying drawings.

Figure 1:
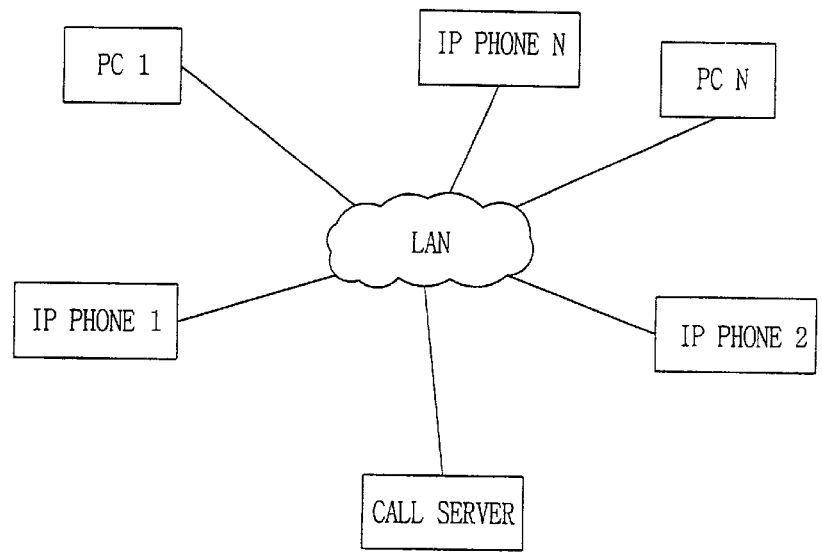
FIG. 1 is a constitutional diagram of a LAN in a state where a protocol based on a conventional call server is applied to an IP phone.
Figure 2:
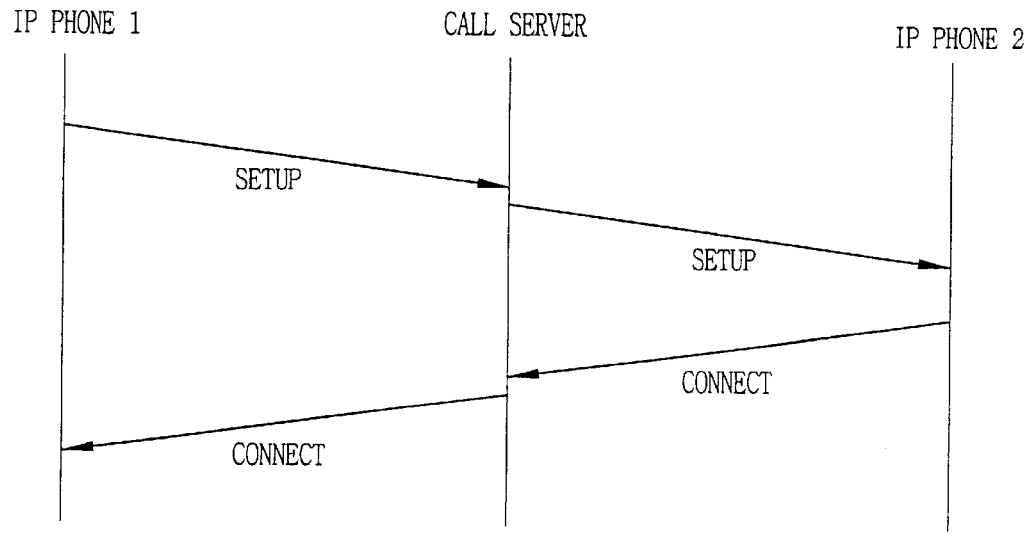
FIG. 2 is a state diagram illustrating a link establishment process of the conventional IP phone.
Figure 3:
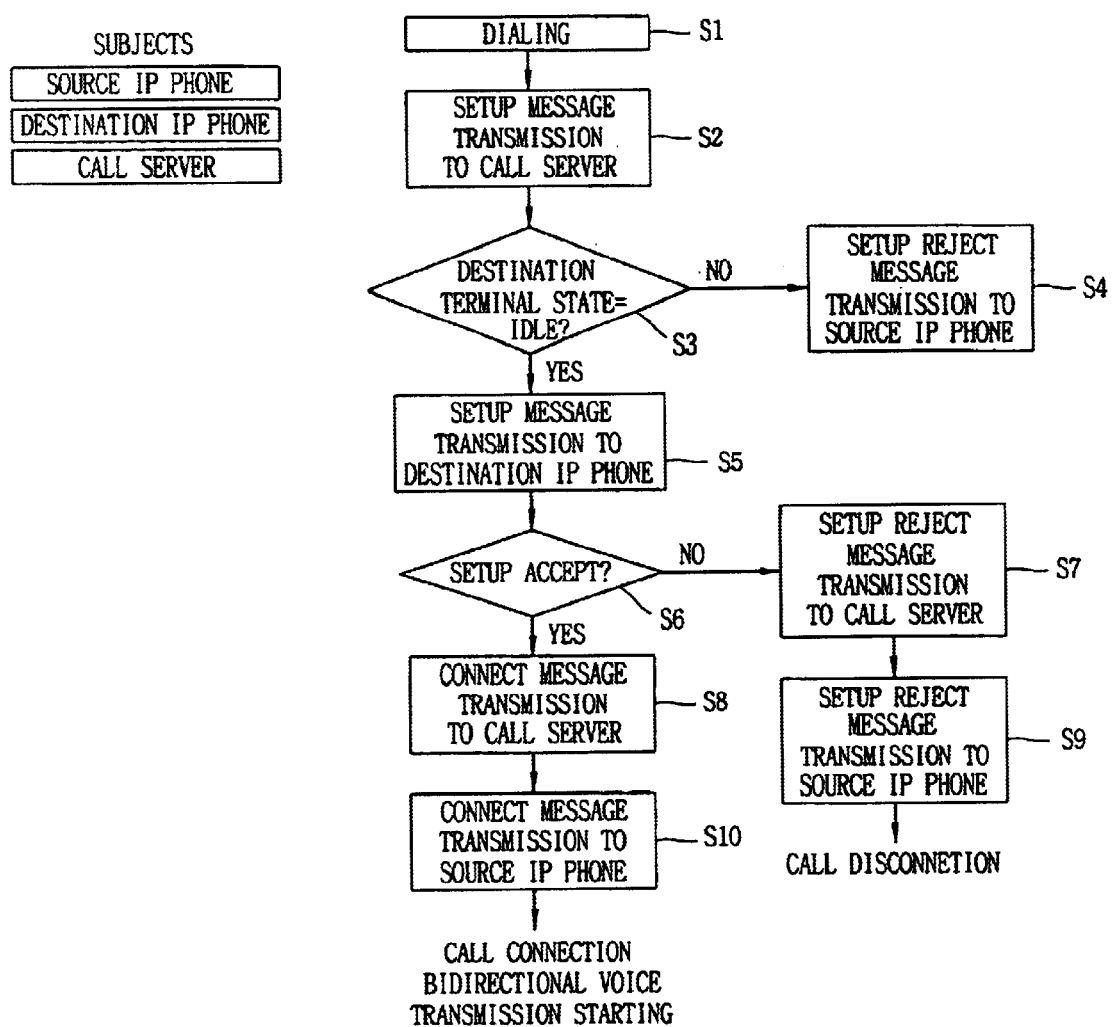
FIG. 3 is a call processing signal flowchart of the conventional IP phone.
Figure 4:
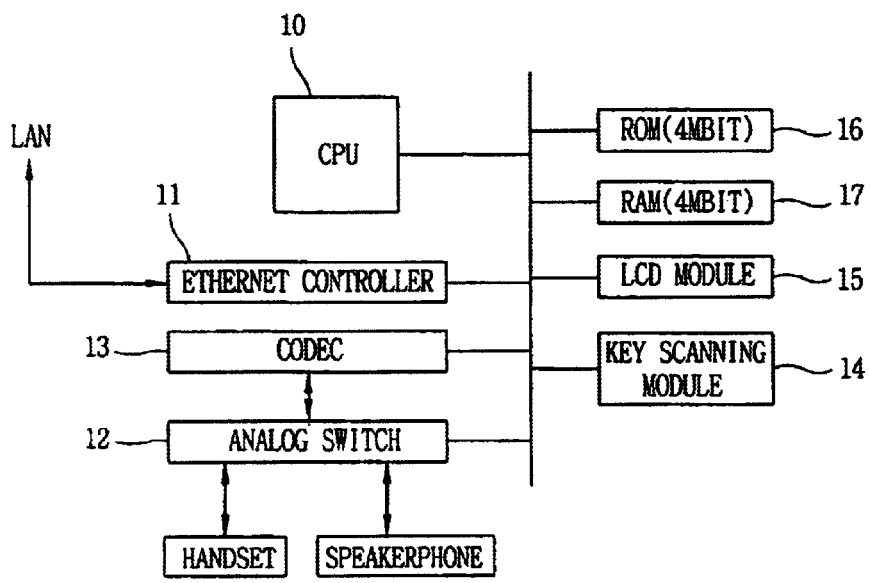
FIG. 4 is a block diagram illustrating a constitution of an IP phone system in accordance with the present invention.

FIG. 4 is a block diagram illustrating a constitution of the internet phone system in accordance with the present invention. As shown therein, the internet phone system includes an Ethernet controller 11 processing a medium access control frame received from a LAN; a switch unit 12 selecting one of analog voice signals inputted from a speaker or handset in accordance with a control signal; a codec 13 processing the analog voice signal inputted from the switch unit 12 or a signal inputted from the LAN; a key button 14 processing a key button input; an LCD module 15 displaying states of all calls; a ROM 16 and a RAM 17 storing inputted data; and a central processing unit 10 controlling the whole operation of the internet phone system.

Figure 5:
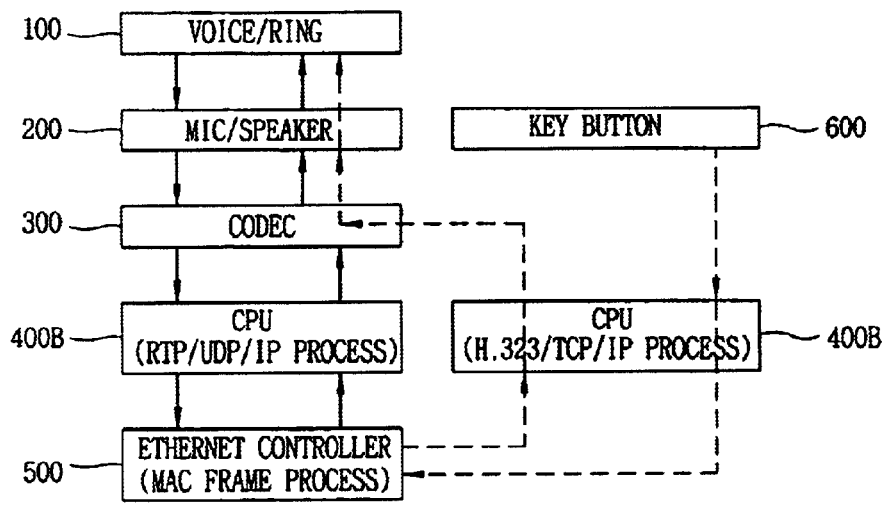
FIG. 5 is a block diagram illustrating a call signal transmission process in the configuration of FIG. 4.

FIG. 5 is a block diagram showing a call signal transmission flow. A call control flow will now be explained. As indicated by a dotted line, when the user inputs a specific key through a key button 600, a corresponding signal is inputted to an Ethernet controller 500 which is a module processing a medium access control frame inputted from the LAN via a CPU 400B processing a TCP/IP process having a standard of H.323, passed through a codec 300, and sounds a voice ring 100 through a mike/speaker 200.

The voice flow will now be explained. As indicated by a solid line, when a voice signal is inputted from the voice ring 100 to the mike/speaker 200, the analog voice signal is converted to a digital signal in the codec 300, processed in the CPU 400B according to a real time protocol/user datagram protocol/internet protocol RTP/UDP/IP, inputted to the Ethernet controller 500 and transmitted through the LAN. Conversely, the signal inputted through the LAN proceeds in the opposite order.

Figure 6A:
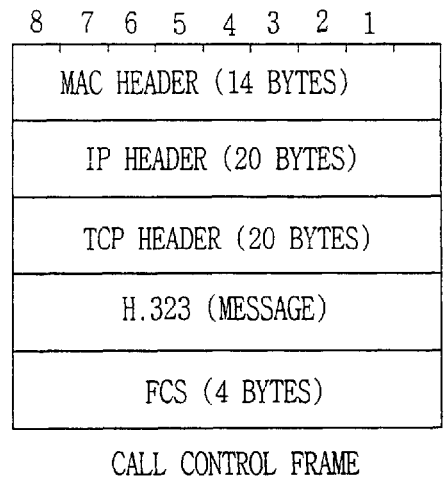
FIGS. 6a and 6b are diagrams illustrating a structure of a message processed in an Ethernet controller in the configuration of FIG. 4.
Figure 6B:
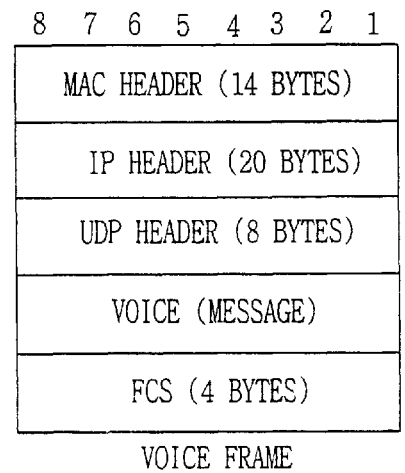

FIGS. 6a and 6b illustrate a structure of a message processed in the Ethernet controller 11 as shown in FIG. 4. FIG. 6a illustrates a MAC header consisting of 14 bytes; an IP header consisting of 20 bytes; a TCP header consisting of 20 bytes; an H.323 message; and a call control frame consisting of an FCS of 4 bytes, and FIG. 6b illustrates a MAC header consisting of 14 bytes; an IP header consisting of 20 bytes; an UDP header consisting of 8 bytes; a voice message; and a voice frame consisting of an FCS of 4 bytes.

Figure 7:
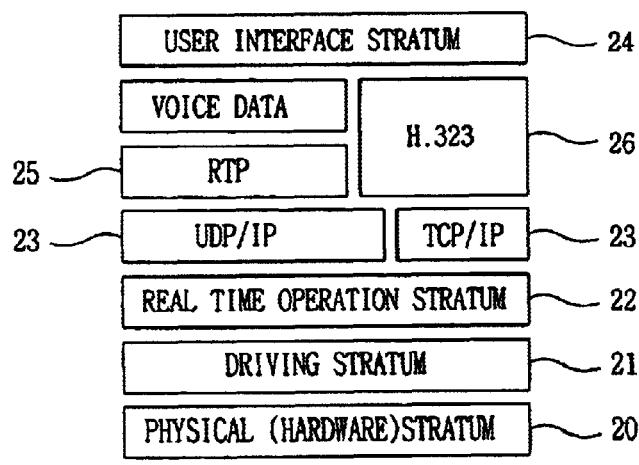
FIG. 7 is a block diagram illustrating a constitution of an IP phone protocol in accordance with the present invention.

FIG. 7 is a block diagram illustrating a constitution of an IP phone protocol to which the present invention may be applied. As shown therein, the IP phone protocol includes: a physical (hardware) stratum 20 providing a mechanical and functional means for connection setup and maintenance, and disconnection between links; a driving stratum 21 deciding driving properties of each electric and mechanical device of the physical stratum 20; a real time operation stratum RTOS 22 controlling the whole system in a software method; a transportation stratum 23 deciding properties in processing a packet stream in a packet exchange; a user interface stratum 24 receiving an intention of the user through the IP phone; a voice link stratum 25 linking a voice channel between the IP phones; and an H.323 stratum 26 exchanging and storing state information of each IP phone in a packet form, and setting up the link.

Figure 8:
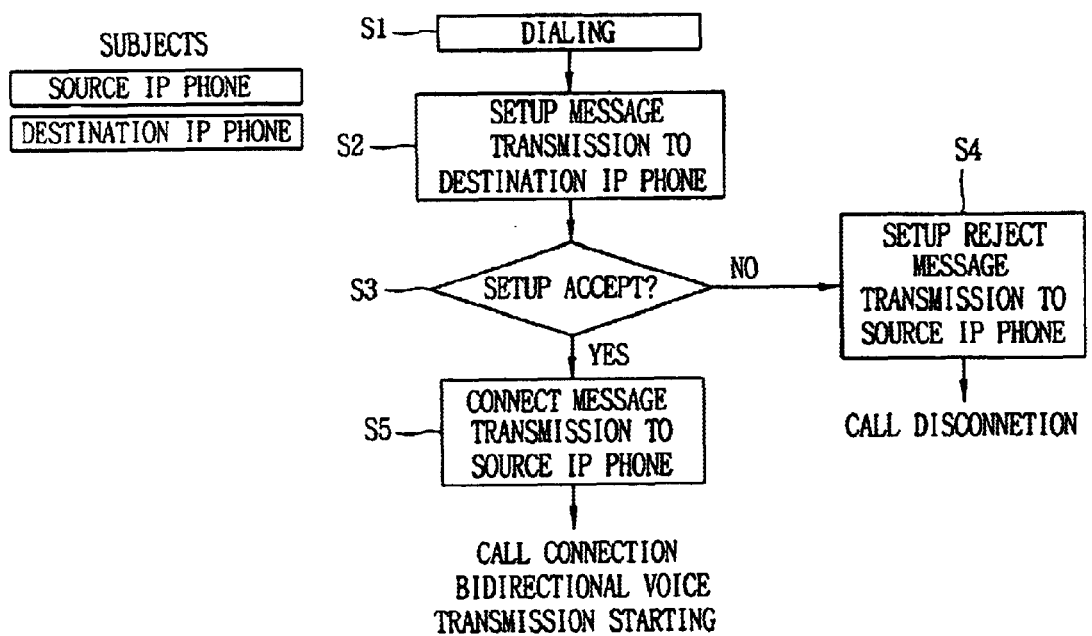
FIG. 8 is a whole flowchart of an IP phone call processing signal in accordance with the present invention.

FIG. 8 is a flowchart showing an IP phone call process. The IP phone call processing flow includes: a first step of dialing (S1); a second step of transmitting a setup message to a designation IP phone (S2); a third step of discriminating whether the setup is accepted (S3); a fourth step of transmitting a setup rejection message to a source IP phone, and disconnecting a call, when the setup is not accepted in the third step (S4); and a fifth step of transmitting a connect message to the source IP phone, connecting the call, and starting a bidirectional voice transmission, when the setup is accepted in the third step (S5).

The above-described operational process will now be described with reference to FIG. 9.

Figure 9:
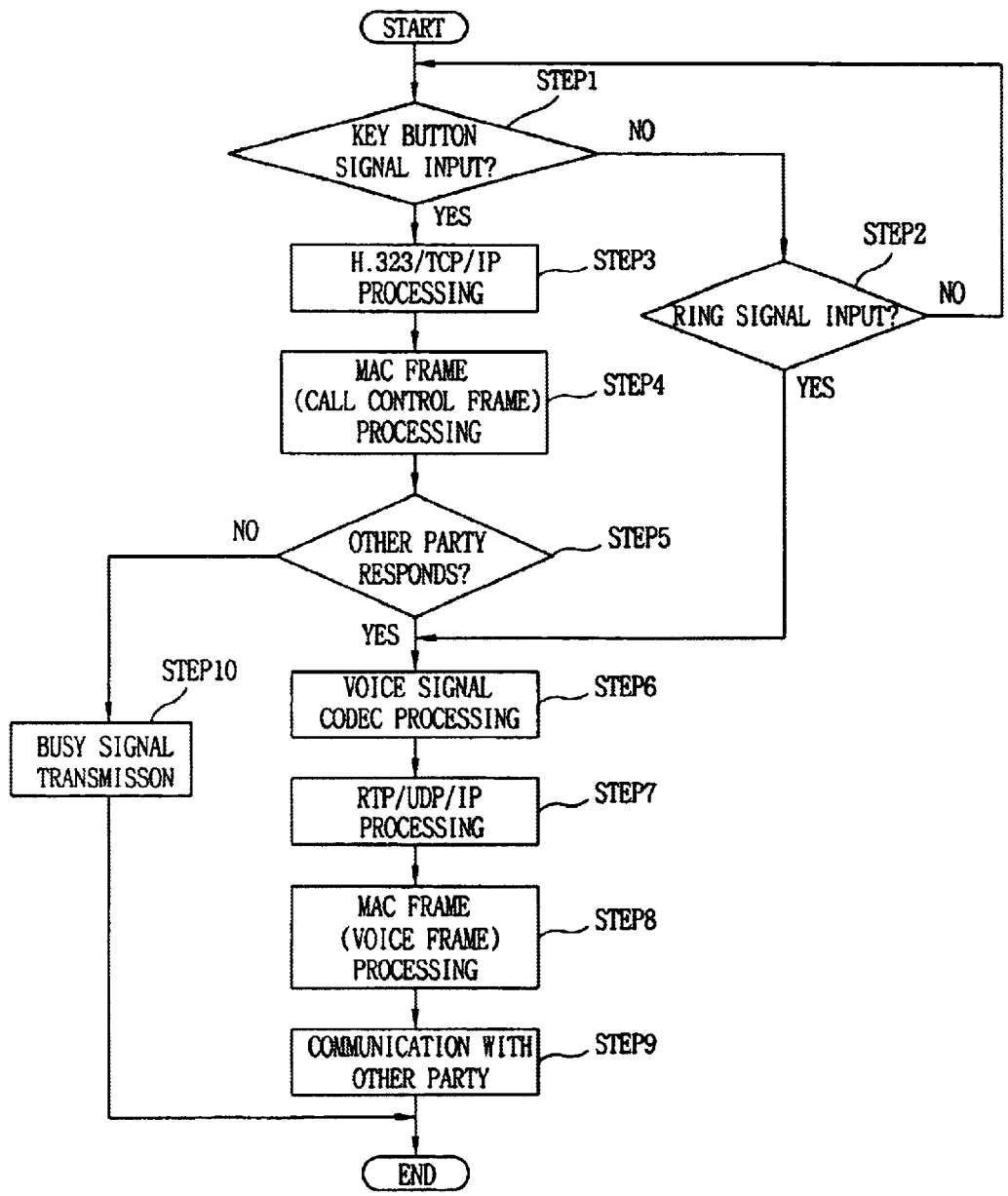
FIG. 9 is a detailed flowchart of the IP phone call processing signal in accordance with the present invention.

FIG. 9 is a detailed flowchart of the IP phone call processing signal. As shown therein, the CPU 10 judges whether the key button signal is inputted (step 1). If not, the CPU 10 judges whether the ring signal is inputted (step 2). In case the key button signal is inputted, the key button signal is processed in accordance with H.323 and TCP/IP (step 3), and transmitted to the Ethernet controller 11. The Ethernet controller 11 processes the MAC frame (call control frame) as shown in FIG. 6a, and transmits it to the other party through the LAN(step 4).

Thereafter, the CPU 10 judges whether the other party responds (step 5). As a result of judgment, when the other party responds, the voice signal of the user is decoded in the codec 13 (step 6), processed in accordance with the RTP/UDP/IP (step 7), and transmitted to the Ethernet controller 11. The Ethernet controller 11 processes the MAC frame (voice frame) as shown in FIG. 6b (step 8), thereby connecting the call with the other party (step 9).

As a result of judgment (step 2), if the ring signal is inputted, the sixth step (step 6) is performed. If not, the process is returned to the first step (step 1). As a result of judgment (step 5), when the other party does not respond, the busy signal is transmitted (step 10), and the process is finished.

As discussed earlier, the internet phone system and the control method therefor in accordance with the present invention can employ the IP phone merely by one internet exclusive terminal without using the server. Accordingly, the constitution of the system is simplified, and thus the installing process is not complicated. In addition, the system constitution cost is reduced. Furthermore, the real time voice communication is possible, thereby removing the time delay of the phone itself. Consequently, the communication quality is improved.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A control method for an internet phone system, comprising:

judging whether a key button signal is inputted;

judging whether a ring signal is inputted, when the key button signal is not inputted as a result of judgment of whether the key button signal is inputted;

processing the key button signal in accordance with H.323 and transmission control protocol/internet protocol TCP/IP), and for processing a medium access frame including a call control frame, when inputted as a result of judgment of whether the key button signal is inputted;

judging whether the other party responds, when the processing of the key button signal is finished;

processing a voice signal in a codec, processing it in accordance with real time protocol/user datagram protocol/internet protocol (RTP/UDP/IP), processing a medium access control frame including a voice frame, and communicating with the other party when the other party responds as a result of judging whether the other party responded;

performing the processing of the voice signal in a codec, when the ring signal is inputted as a result of judgment of whether the ring signal was inputted, or returning to the judging of whether the key button signal is inputted when the ring signal is not inputted; and transmitting a busy signal and finishing the process, when the other party does not respond as a result of judgment of whether the other party responded.

2. A recorded medium for an internet phone system control program, comprising:

means for judging whether a key button signal is inputted;

means for judging whether a ring signal is inputted, when the key button signal is not inputted as a result of judgment;

means for processing the key button signal in accordance with H.323 and transmission control protocol/internet protocol TCP/IP), and processing a medium access frame including a call control frame, when inputted as a result of judgment;

means for judging whether the other party responds, when the means for processing is finished;

means for codec-processing a voice signal in a codec, processing it in accordance with real time protocol/user datagram protocol/internet protocol (RTP/UDP/IP), processing a medium access control frame including a voice frame, and communicating with the other party, when the other party responds as a result of judgment;

means for further performing the codec-processing of the voice signal, when the ring signal is inputted as a result of judgment, or returning to the means for judging the key button signal when the ring signal is not inputted; and means for transmitting a busy signal and finishing the process, when the other party does not respond as a result of judgment.

* * * * *